(12) United States Patent
Young

(10) Patent No.: US 8,837,911 B2
(45) Date of Patent: *Sep. 16, 2014

(54) GENERATING TRANSITIONS FOR REMAPPING VIDEO PLAYBACK TIME

(75) Inventor: Paul E. Young, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/429,220

(22) Filed: Mar. 23, 2012

(65) Prior Publication Data

US 2013/0163962 A1    Jun. 27, 2013

Related U.S. Application Data

(63) Continuation of application No. 11/735,958, filed on Apr. 16, 2007, now Pat. No. 8,233,772.

(51) Int. Cl.
*H04N 5/93* (2006.01)

(52) U.S. Cl.
USPC ......................................................... 386/278

(58) Field of Classification Search
CPC ........... H04N 5/00; H04N 5/783; H04N 7/00; H04N 7/0127; H04N 9/00; H04N 5/76
See application file for complete search history.

(56) References Cited

U.S. PATENT DOCUMENTS

| | | | |
|---|---|---|---|
| 6,115,037 A | 9/2000 | Sumiyoshi et al. | |
| 6,714,216 B2 | 3/2004 | Abe | |
| 8,170,396 B2 * | 5/2012 | Kuspa et al. | 386/282 |
| 8,233,772 B1 * | 7/2012 | Young | 386/278 |
| 2004/0148576 A1 | 7/2004 | Matveyenko et al. | |
| 2006/0044955 A1 | 3/2006 | Komori et al. | |
| 2008/0016114 A1 | 1/2008 | Beauregard et al. | |
| 2010/0275121 A1 | 10/2010 | Johnson | |

OTHER PUBLICATIONS

Adobe Premiere Pro 2.0 User Guide, Changing clip attributes, publication page and pp. 157-158, 2005.
http://vfwtech.com/Liquid/Tutorials_pinnacle.htm, vfwTech.com & Softwright, Inc., Avid Liquid User's Group of Colorado, Apr. 15, 2007, Pinnacle Free Tutorials for Liquid Edition, 11 pages.
http://www.adobe.com/designcenter/premiere/articles/prp15sddifspeed.html, Adobe Design Center Tutorial Altered rates: Varying playback speed, Feb. 1, 2005, 7 pages.

(Continued)

*Primary Examiner* — Huy T Nguyen
(74) *Attorney, Agent, or Firm* — Wolfe-SBMC

(57) ABSTRACT

The present disclosure includes systems and techniques relating to generating transitions for remapping video playback time. The subject matter described in this specification can be embodied in a method that includes providing a digital video editing user interface that includes a variable rate speed control configured to define associated keyframe elements including a begin element, an end element and an intermediate time element; receiving input defining at least one of the keyframe elements in relation to a sequence of digital video; and generating a time transition function for remapping playback time of the video based on the input, wherein the time transition function maintains predefined speed for video frames leading into the begin element, maintains predefined speed for video frames leading away from the end element, and changes video speed from a begin speed value to an end speed value in accordance with one or more intermediate time element values.

27 Claims, 13 Drawing Sheets

(56) References Cited

OTHER PUBLICATIONS http://www.apple.com/lae/finalcutpro/editing.html, Razor-Sharp tools, time remapping and mode-free editing, Jan. 26, 2007, 2003 Apple Computer, 3 pages.

Liquid Edition 5.5—Product Comparison, World Class Color Correction, Pinnacle Systems, 8 pages.

"Final Office Action", U.S. Appl. No. 11/735,958, (Nov. 1, 2011), 10 pages.

"Non-Final Office Action", U.S. Appl. No. 11/735,958, (May 26, 2011), 8 pages.

"Notice of Allowance", U.S. Appl. No. 11/735,958, (Jan. 12, 2012), 5 pages.

* cited by examiner

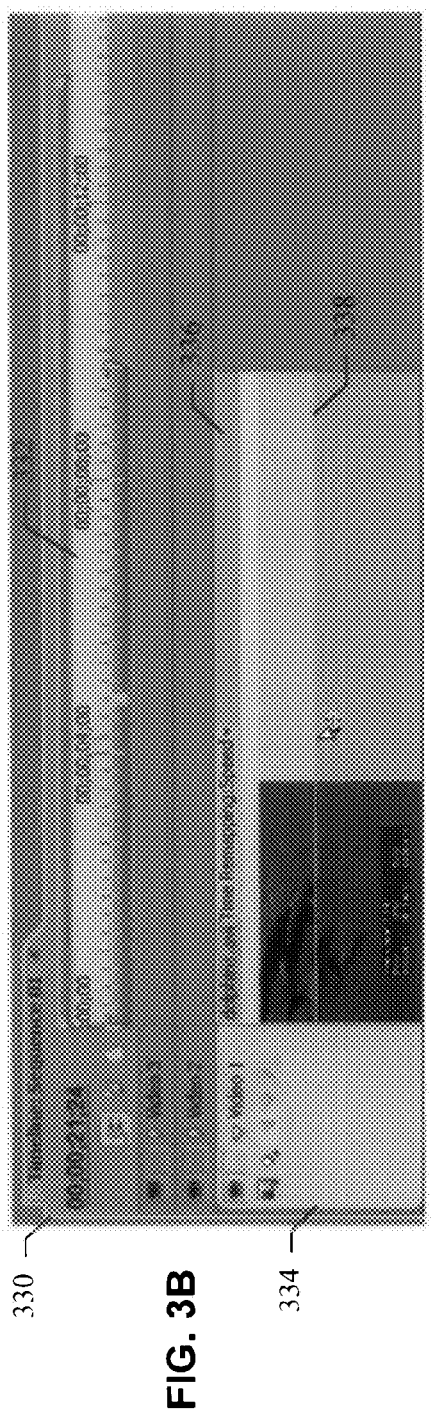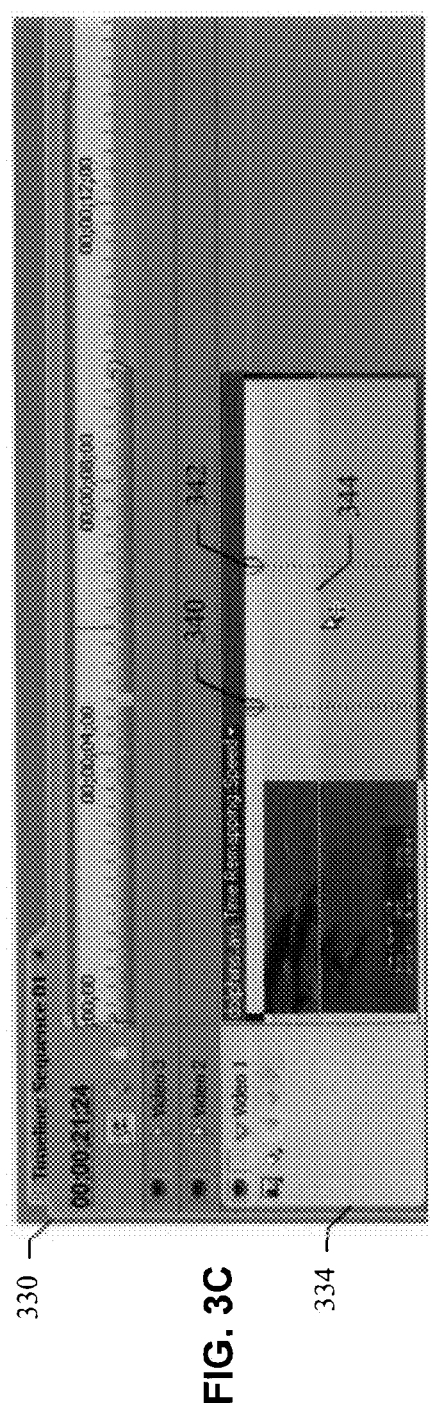
FIG. 3B
FIG. 3C

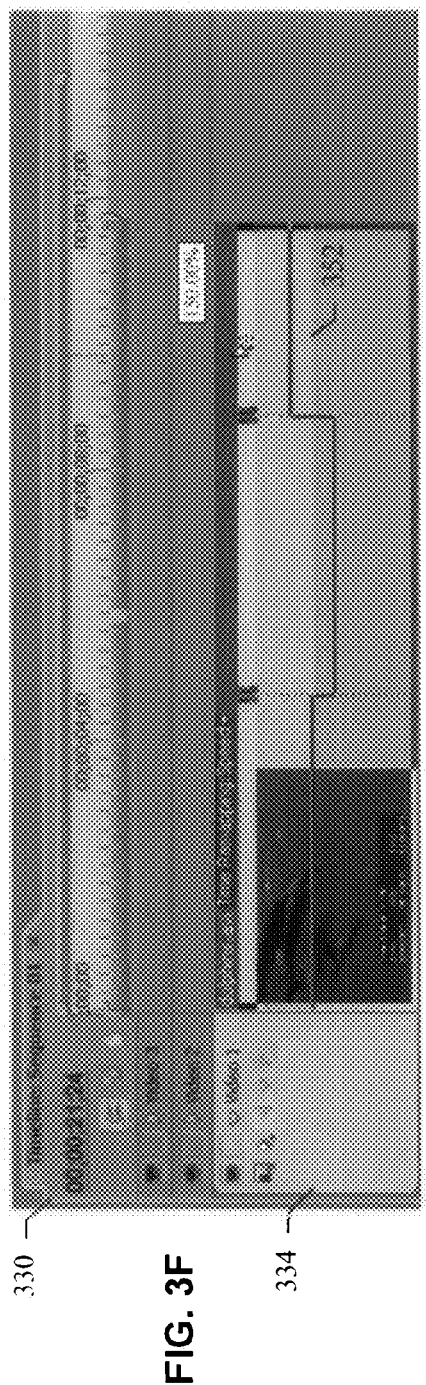
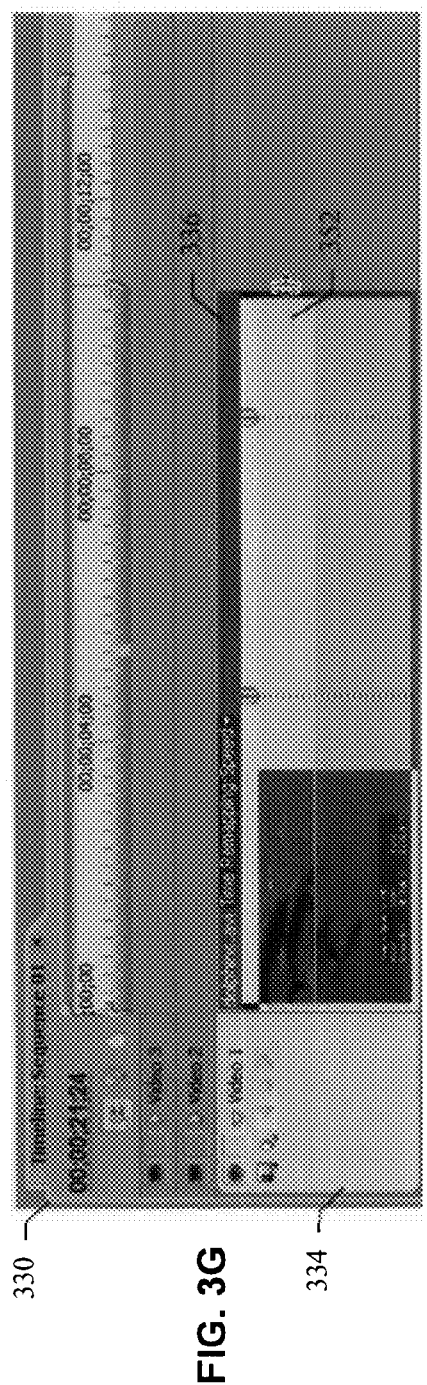
FIG. 3F
FIG. 3G

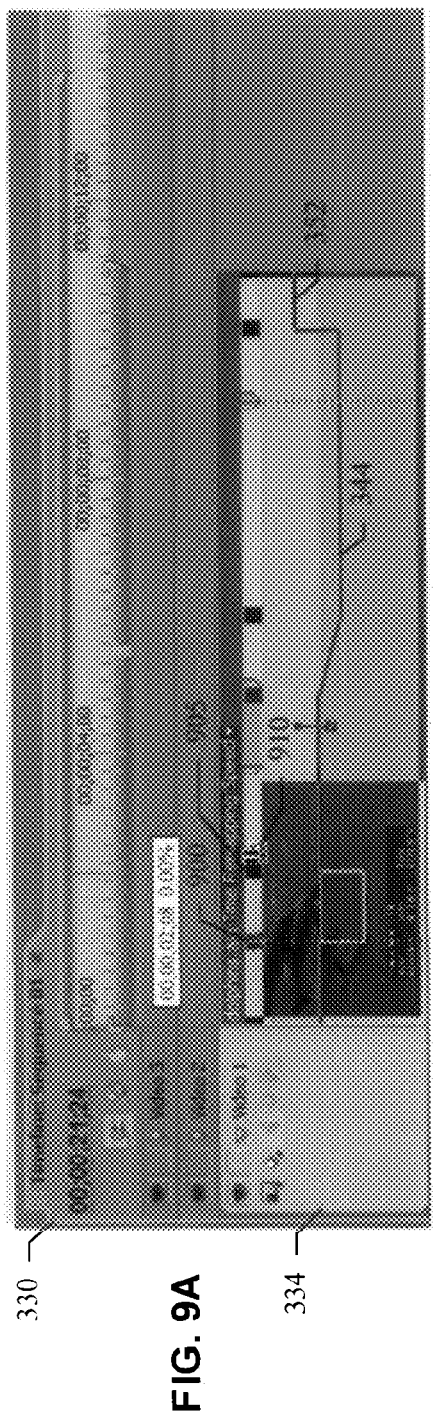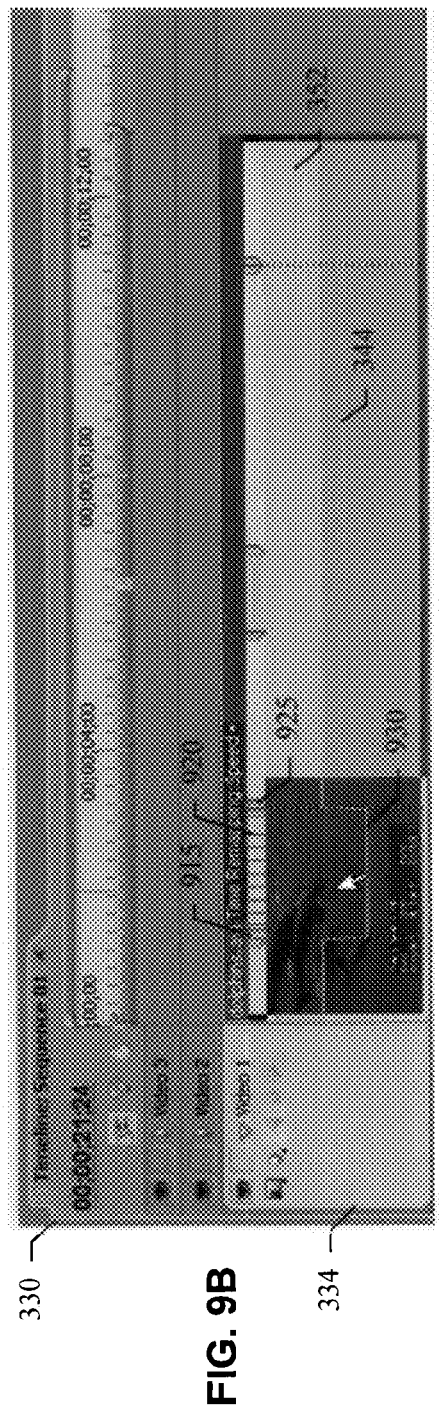
FIG. 9A
FIG. 9B

GENERATING TRANSITIONS FOR REMAPPING VIDEO PLAYBACK TIME

CROSS-REFERENCE TO RELATED APPLICATIONS

This application is a continuing application of, and claims priority to, U.S. patent application Ser. No. 11/735,958, entitled "GENERATING TRANSITIONS FOR REMAPPING VIDEO PLAYBACK TIME" to Paul E. Young, filed on Apr. 16, 2007, and related to U.S. patent application Ser. No. 11/735,951, entitled "CHANGING VIDEO PLAYBACK RATE" to David Kuspa et al., which was filed on Apr. 16, 2007, and to U.S. patent application Ser. No. 11/735,945, entitled "INDICATING DIFFERENT VIDEO PLAYBACK RATES" to David Kuspa, which was filed on Apr. 16, 2007. The disclosures of the above applications are incorporated herein by reference in their entirety.

BACKGROUND

The present disclosure relates to changing video playback rate and playback time in a digital video editing system.

Various time remapping solutions exist to map source media frames to output media frames. Time remapping (also known as variable speed playback) involves dynamically controlling the speed of a video clip and alternating between a range of speeds in both forward and reverse playback, as well as freeze frames. Typically, a time remapping software feature uses a speed/velocity graph, where control points are set and Bezier-like curves dictate the playback speed and direction between the control points. Each control point can be moved in the graph, allowing the video editor to control the playback rate at that control point. After each such movement of a control point, the Bezier-like curves connecting the control points are recalculated, thereby determining the playback speed (and direction) between the control points. Furthermore, to help distinguish between various playback rates, at least one user interface for a time remapping feature has included straight, vertical tic marks that are spaced closer together or further apart to indicate deceleration or acceleration, and red tic marks to indicate reverse playback direction.

SUMMARY

This specification describes technologies relating to changing video playback rate and playback time in a digital video editing system. In general, one aspect of the subject matter described in this specification can be embodied in a method that includes providing a user interface for a digital video editing system, the user interface including a variable rate speed control configured to define associated keyframe elements including a begin element, an end element and an intermediate time element; receiving, through the variable rate speed control, input defining at least one of the keyframe elements in relation to a sequence of digital video; and generating a time transition function for remapping playback time of the sequence of digital video based on the input, wherein the time transition function maintains predefined speed for video frames leading into the begin element, maintains predefined speed for video frames leading away from the end element, and changes video speed from a begin speed value associated with the begin element to an end speed value associated with the end element in accordance with one or more values associated with the intermediate time element. Other embodiments of this aspect include corresponding systems, apparatus, and computer program products.

These and other embodiments can optionally include one or more of the following features. Providing the user interface can include presenting a single control handle useable to define the one or more values of the intermediate time element, the one or more values defining a non-linear transition between the begin element and the end element, and receiving the input can include receiving the one or more values of the intermediate time element through the single control handle. Providing the user interface can include presenting a first control handle useable to define values for the begin element and a second control handle useable to define values for the end element, and receiving the input can include: receiving, through at least one of the first and second control handles, a source-referenced input specifying a location in the sequence of digital video; and separately receiving, through at least one of the first and second control handles, a target-referenced input specifying a duration for the time transition function.

Generating the time transition function can include setting the begin speed value to a constant begin speed associated with the video frames leading into the begin element, and setting the end speed value to a constant end speed associated with the video frames leading away from the end element. Generating the time transition function can include calculating the time transition function within a larger timing function including the predefined speed for the video frames leading into the begin element, the predefined speed for the video frames leading away from the end element and the time transition function, such that a first derivative of the larger timing function corresponds to a continuous function. Moreover, generating the time transition function can include preventing the time transition function from overshooting either the predefined speed for the video frames leading into the begin element or the predefined speed for the video frames leading away from the end element.

Generating the time transition function can include determining a combination of two curves between a first location of the begin element and a second location of the end element, the two curves being rotationally symmetrical around a central point between the first and second locations. Receiving the input can include receiving an exponential weighting for the intermediate time element, and determining the combination of two curves can include determining the two curves in accordance with the exponential weighting.

Particular embodiments of the subject matter described in this specification can be implemented to realize one or more of the following advantages. A user interface of a digital video editing system can employ a time remapping feature that provides the ability to clearly delineate ranges of time in which there is a change in playback rate versus other times where the user wants the playback rate to remain constant. Changes in playback rate can be confined to specific portions of a video sequence as desired and specified by the user of the video editing system. This can prevent changes made to playback rate in one portion of a video sequence from causing undesired changes in other portions of the video sequence. Moreover, the portions of a video sequence in which a transition in playback rate is to occur can be specified using an improved user interface, including a split-able keyframe point.

A time transition function can be defined between two user specified keyframe points in a sequence of digital video, where the time remapping transition between the two user specified keyframe points can be controlled by the user without moving those two keyframe points. A control point can be provided within a transition region, and precise control can be provided to the user throughout the range of time leading up to, and away from the control point. Moreover, this control can be provided while also providing a smooth transition in payback rate from the first keyframe point, through the transition region, and to the last keyframe point. Thus, the user of a time remapping system can readily create accurate acceleration sections (both positive and negative) between differing velocity sections of digital video. This can allow a user to get consistently good results for the most common time remapping case of sections of constant velocity with clearly defined regions of acceleration in between.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 3B-3G show example interactions with a user interface to change video playback rate.

FIGS. 9A-9D show example interactions with a user interface to change video playback rate and resulting indications of the different video playback rates.

Like reference numbers and designations in the various drawings indicate like elements.

DETAILED DESCRIPTION

Figure 1:
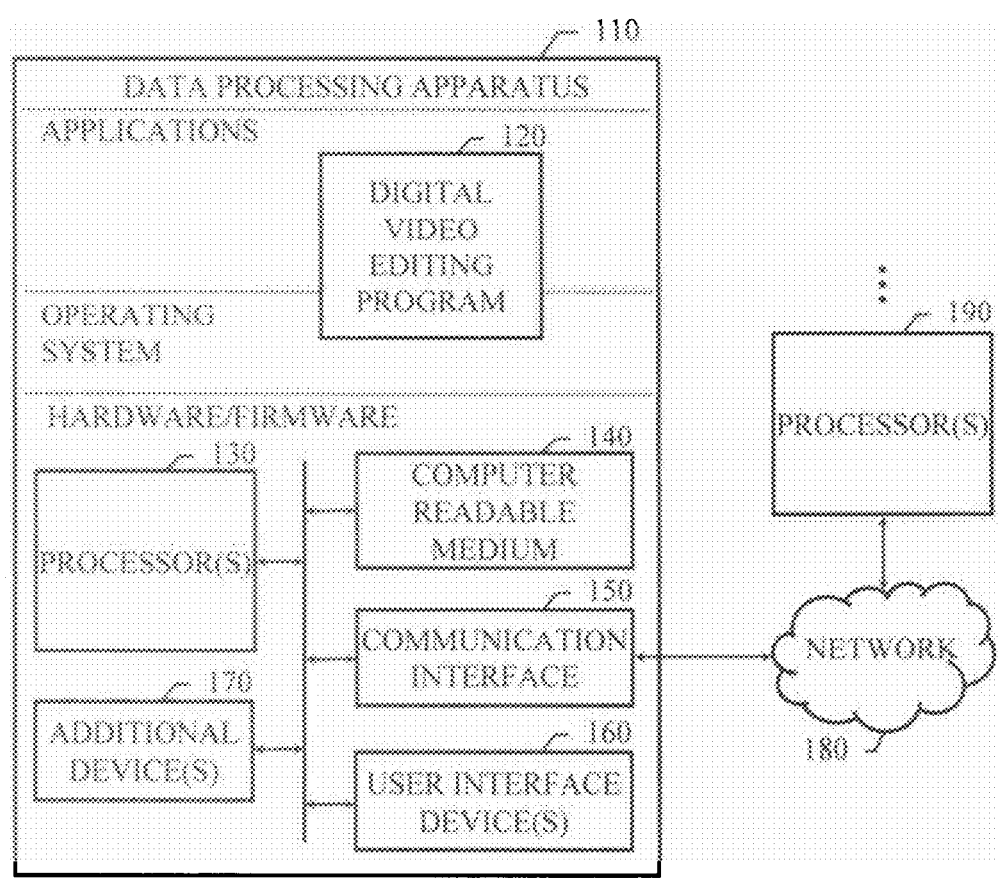
FIG. 1 shows an example system used to change playback rate for digital video, indicate different video playback rates, and generate transitions for remapping video playback time.

FIG. 1 shows an example system used to change playback rate for digital video, indicate different video playback rates, and generate transitions for remapping video playback time. A data processing apparatus 110 can include hardware/firmware, an operating system and one or more programs, including a digital video editing program 120. The video editing program 120 operates, in conjunction with the data processing apparatus 110, to effect various operations described in this specification. Thus, the program 120, in combination with processor(s) and computer-readable media (e.g., memory), represents one or more structural components in the system.

The video editing program 120 can be a video editing application, or a portion thereof. As used herein, an application refers to a computer program that the user perceives as a distinct computer tool used for a defined purpose. An application can be built entirely into the operating system (OS) of the data processing apparatus 110, or an application can have different components located in different locations (e.g., one portion in the OS or kernel mode, one portion in the user mode, and one portion in a remote server), and an application can be built on an application execution environment (e.g., a virtual machine or a runtime library that provides various utility services to applications) serving as a software platform of the apparatus 110. Moreover, an application can be a graphical user interface application (e.g., a Web browser) that connects to one or more processors 190 (e.g., one or more Web servers) over a data communication network 180 (e.g., the Internet) and provides the computer tool as a network service.

The video editing program 120 can include (or be included in) various types of software that focus on different types of image processing, such as visual effects, image editing and video editing (e.g., Adobe® After Effects® software, Adobe® Photoshop® software, Adobe® Premiere® software, each available from Adobe Systems Incorporated of San Jose, Calif.). Thus, the video editing program 120 can operate on digital images from many different sources and can be directed to various image processing workflows. Moreover, digital video (which for brevity will simply be referred to as video) does not necessarily correspond to a file. Video can be stored in a portion of a file that holds other video and images, in a single file dedicated to a given video clip, or in multiple coordinated files.

The data processing apparatus 110 includes one or more processors 130 and at least one computer-readable medium 140 (e.g., random access memory, storage device, etc.). The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the video editing 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Figure 2:
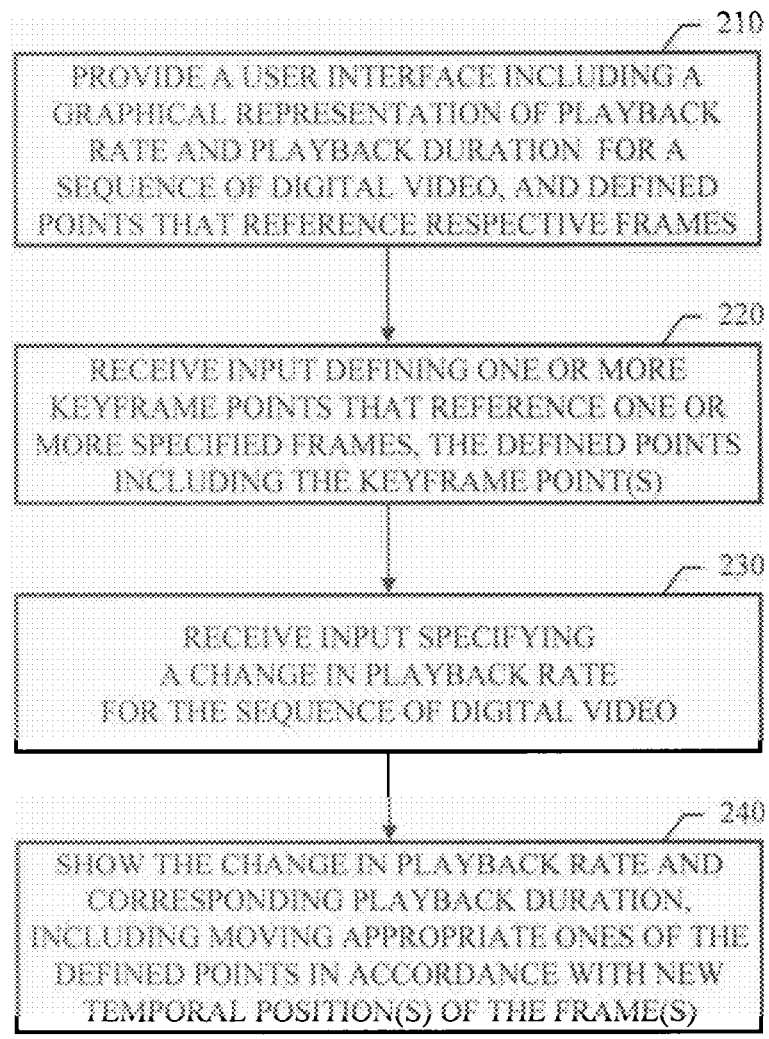
FIG. 2 shows an example process of changing video playback rate.

FIG. 2 shows an example process of changing video playback rate, as can be implemented using the system of FIG. 1. A user interface can be provided 210 including a graphical representation of playback rate and playback duration for a sequence of digital video. The user interface also includes defined points that reference respective frames in the sequence of digital video. Each such reference links a defined point to a specific frame in the video, such that as video playback duration is adjusted, and the specific frame in the source video is moved to a new temporal location in the output video due to variations in playback rate, the corresponding defined point moves with that specific frame. The defined points can include a begin point of the video sequence, an end point of the video sequence, and one or more keyframe points there between.

Input defining the one or more keyframe points can be received 220, where each such new keyframe point is then included in the defined points. For example, a user can employ a mouse controlled cursor to point to a location in the graphical representation and create a keyframe point at the location (e.g., by mouse click, keyboard input, or combination thereof). The frame of the digital video that corresponds to the location can be shown to the user before creation of the keyframe point, and the reference linking the new keyframe point to the specific frame of the source digital video (e.g., the source video file) can be created along with the keyframe point itself.

A new keyframe point refers to a specific frame of the source digital video and remains locked to that frame while speed adjustments are made. However, a keyframe point need not be permanently locked to that frame, and the user interface can provide a function whereby the user can specify a new frame to which an existing keyframe point should refer. For example, in some implementations, a graphical representation of the keyframe point can be grabbed and moved using the mouse to specify a new frame in the source video to lock to. Various keyboard shortcuts can also be provided to facilitate manipulation of keyframe points, such as described further below.

Input specifying a change in playback rate can be received 230 for the sequence of digital video. This input can include user manipulation of one of the defined points. For example, a user specified keyframe point can be dragged in the graphical representation in the user interface to specify a duration of still frame playback or a duration of reverse playback, such as described further below in connection with FIGS. 9A-9D. The input can also include user manipulation of segments (horizontal, diagonal, or others) falling between the defined points. For example, a graph segment between two user defined keyframe points can be dragged in the graphical representation in the user interface to specify a new playback rate for that segment, such as described further below in connection with FIGS. 3B-3G.

The change in playback rate can be shown 240 along with the corresponding change in playback duration for the sequence of digital video. This showing involves updating the graphical representation and moving one or more of the defined points in accordance with a new temporal position of corresponding frame(s) referenced by the one or more defined points. Thus, for example, if one keyframe point has been defined in the video sequence, thereby creating two segments, and the first segment is slowed down to half speed, the total duration of the video sequence becomes longer, and the new playback duration of the video sequence is shown in the graphical representation in the user interface. Because the defined points reference specific frames in the video sequence, and slowing down the first segment of the video sequence causes the one keyframe point and the end point of the video sequence to be shown later on during playback, this is directly reflected in the graphical representation by moving the keyframe point and the end point to show the new temporal positions of their corresponding frames in the playback duration for the video sequence. Thus, the second segment is pushed out to the right since it now begins at a later time in the video sequence.

Figure 3A:
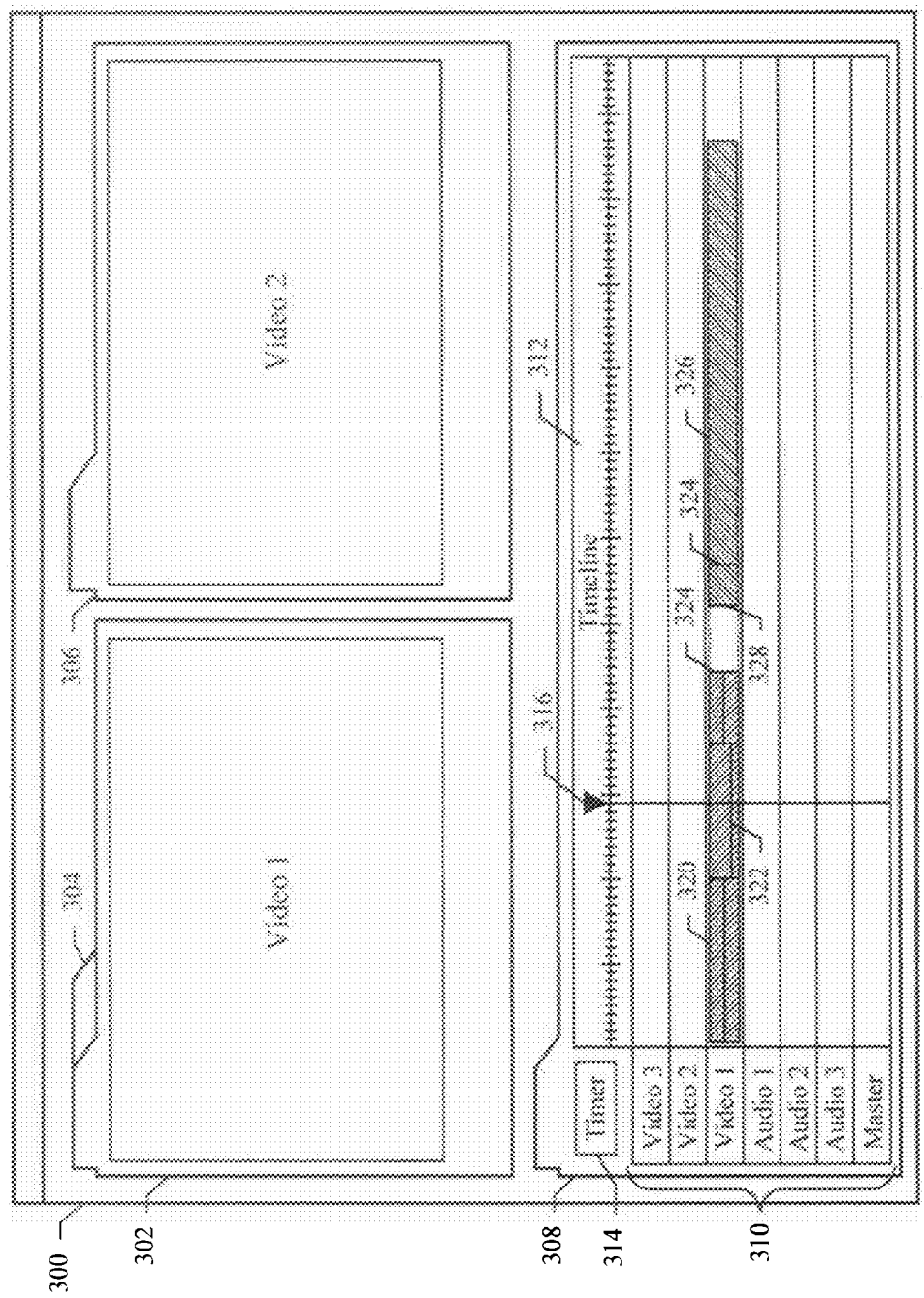
FIG. 3A shows an example user interface, such as can be used with the system of FIG. 1.

A detailed example of this process is now shown and described in connection with FIGS. 3A-3G. FIG. 3A shows an example user interface, such as can be used with the system of FIG. 1, and such as can be used with the processes of FIGS. 2, 4, 6 and 8. An application window 300 includes multiple panels 302, 304, 306 and 308. A user can add, remove, and group panels in the window 300 as desired, and each panel can include a different type of interface (or another instance of a given interface). The various types of interfaces that can be included in a video editing application are well known. Example panels can include a Project panel (a container for all clips used in the project), a Source Monitor (for previewing source clips and marking segments to be edited into the sequence), a Timeline panel (for assembling a sequence by arranging video clips into a program), a Program Monitor (for playing back the active sequence being assembled in the Timeline), and other panels which contain tools for editing, adding effects and monitoring the quality of the output.

A panel 308 includes a timeline interface for use in editing a timeline sequence. The example timeline sequence shown in FIG. 3A includes three video tracks, three audio tracks and a master track 310. Other track arrangements are also possible. A timeline 312 shows duration information for the tracks in the timeline sequence. A timer 314 can be used to show one or more time-related features, such as the current time location of a playback marker 316 in the sequence, a time duration of the tracks or source sequence, a time of day, or an amount of time the source sequence has been edited. Moreover, the timeline interface in the panel 308 can include features to allow zooming into and out of a time duration in the timeline sequence, and one or more markers, such as playback marker 316, to facilitate editing and synchronizing. Such markers can be linked with video shown in the panels 302 and 306, such that the current frames shown in the panels 302 and 306 (which can be from different video sequences or from different portions of the same video sequence) correspond to the location(s) in the timeline interface indicated by the marker(s).

The video tracks shown in the timeline interface can include the video itself. For example, when a video clip is dropped into a track in the timeline interface, that track can expand vertically in the timeline interface to provide additional user interface elements and to show an image from the video clip. FIG. 3B shows an example timeline interface panel 330, with three video tracks, including one track 334 having a video clip entitled "dolphins.avi" included in a track item 336. A frame of the dolphins video clip is shown in the track item 336 to assist the user in recognizing which video clip is being edited, and a time remapping feature has been turned on in the timeline interface. In this example, a graphical representation of playback rate and playback duration is overlaid on the track item 336 in the track 334 of the timeline interface.

This graphical representation includes a plot 338 of playback rate in a graph having a horizontal axis representing playback duration and a vertical axis representing playback rate, plus a horizon line, which can be shown using different colors or shading, can be used to clearly show when the plot 338 is above or below one hundred percent speed. In this example, the units of the horizontal axis are shown in a time ruler bar 332 above the track 334 in the timeline, but the units of the vertical axis are not shown. In other implementations, the units of the vertical axis can be shown, such as in frames per second or percentage of the source media playback speed. The plot 338 can be grabbed using a mouse input device and dragged up or down to increase, or decrease playback rate, respectively. Once the plot 338 is selected, a pop up can show the current value of the playback rate (e.g., one hundred percent upon first grabbing the plot 338, where positive percentages indicate forward playback, and negative percentages indicate reverse playback).

Figure 3D:
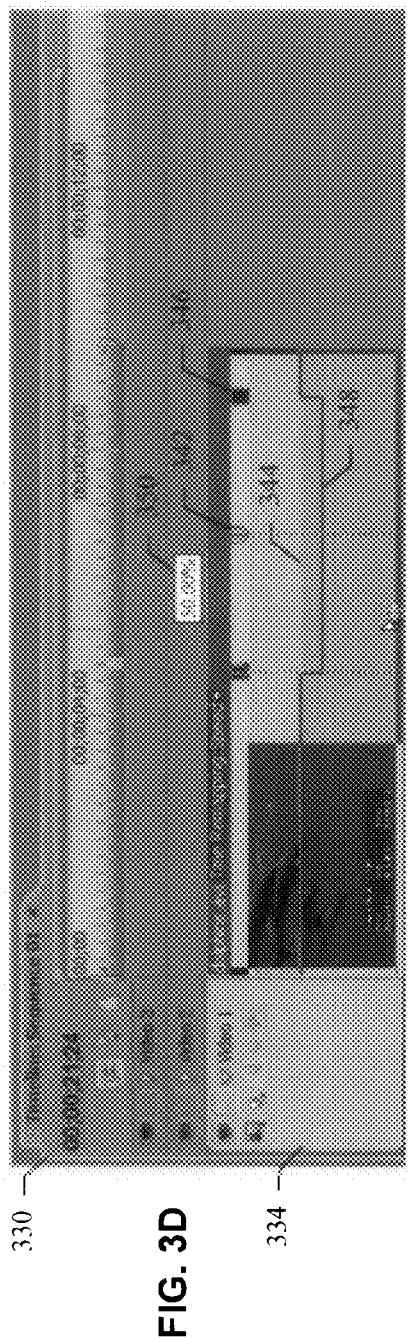

FIG. 3C shows the same panel 330 after two keyframe points 340 and 342 have been created by the user. Thus, the plot 338 has been implicitly divided into three segments, including a middle segment 344, where each of these segments has a corresponding subset of frames in the video clip, dolphins.avi. When the user performs a drag operation on the middle segment 344, the user interface can reflect the change as shown in FIG. 3D. During the drag operation, a temporary segment 348 can stretch or compress to show the new adjusted playback rate and playback duration for the segment 344, and a pop-up display 350 shows the current playback rate for the segment 344 as a percentage of the original playback rate for the video clip. In addition, a temporary marker 346 shows the new temporal position for the keyframe point 342. Thus, as the drag operation pulls the segment 344 down, the temporary segment 348 moves down and extends to the right, and the temporary marker 346 moves to the right. In this case, the track item's duration is lengthened due to the extra frames that are created to play back the source video in slow motion.

Figure 3E:
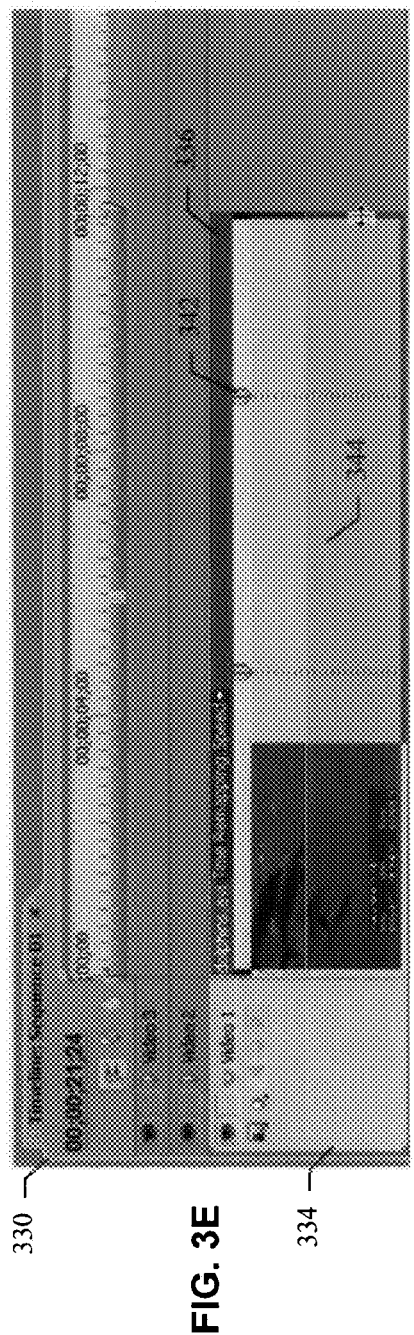

Once the drag operation is completed, the segment 344, the keyframe point 342 and the end of the track item point are all updated, as shown in FIG. 3E. Using the temporary segment 348 and the temporary marker 346 can assist in making the result of the drag operation easy to follow. It can also allow the user to visually align the shifting keyframe with a specific event in the sequence (by looking at the time ruler bar 332, or at another track item in a different track). This can facilitate the editing process, such as when timing a variable playback segment to coincide with specific points in the sequence (e.g., an effect or a music cue). In other implementations, the segment 344 and the keyframe point 342 (as well as the end of the track item) can be updated in real-time as the drag operation proceeds.

As a concrete example of the workflow here, consider that the video clip, dolphins.avi, may include a portion where a dolphin jumps out of the water. The user can set the first keyframe point 340 to the frame where the dolphin first begins to come out of the water, and set the second keyframe point 342 to the frame where the dolphin first begins to enter the water again. Now the user can freely adjust the speed of this segment of the video, while keeping the beginning and ending of the slow motion segment fixed to the specified frames in the video clip.

Furthermore, note that each of the three segments, delineated by the two keyframe points and the begin and end points of the video clip, can be individually dragged to speed up and slow down the playback rate for that segment. Thus, a segment 352 can be dragged up to one hundred and fifty percent, as shown in FIG. 3F. After this drag operation, the track item 336 is updated to reflect the new clip duration, as shown in FIG. 3G. In this case, the track item is shortened, because fewer frames are playing due to the fast motion effect.

In addition, when the end of a track item is updated to show the new duration of the track item, the track item can be automatically trimmed in the timeline interface when the end point moves beyond a begin point of an adjacent track item to the right in that track. For example, as shown in FIG. 3A, when a segment 322 of a track item 320 is dragged down to reduce the playback rate of the segment 322, the end 324 of the track item 320 is pushed against (and beyond) the beginning 328 of a next track item 326 in the timeline interface, but the overlapping portion of the track item 320 can automatically trimmed (so the end 324 of the track item 320 is moved so it stays at the beginning 328 of the track item 326). In other words, adjusting the speed in the track item 320 need not cause over-writing of the next track item 326.

In this case, the track item 320 can be truncated at the beginning 328 of the next track item 326 in the timeline interface. The truncated portion of the track item 320 is not lost, however, but rather is still available for use in the timeline interface, such as by making further speed adjustments in the track item 320, by moving the track item 326 in the timeline interface and trimming out track item 320 so that it fills the gap, or by creating a transition effect between the track items 320 and 326. In addition, a trim cursor can appear in the user interface when the mouse pointer hovers over the end of the track item, and this trim cursor can be used trim out the track item to reveal additional available frames from the source video. The trim operation can be used to recover speed keyframes that were pushed beyond the edge of the track item and into the media portion that is not visible in the trimmed track item. As noted, this can occur when an adjacent track item to the right prevents the track item from expanding into it and overwriting it. In any event, if there is no next track item in the timeline interface, the track item 320 is free to expand or contract in duration in the timeline interface.

If one or more segments of the track item 320 are sped up, such that the total duration of the track item 320 no longer reaches the next track item 326, the new shorter duration for the track item 320 can be shown in the timeline interface, even though this leaves a blank space between the track items 320 and 326. There is no requirement that track items which previously abutted each other in the timeline interface need continue to do so. This allows the user to more accurately control the changes in playback rate for the entire track item, and the user can clearly identify where the source media runs out, as opposed to having to scrub through the video in the track item to find where the media ran out.

Figure 4:
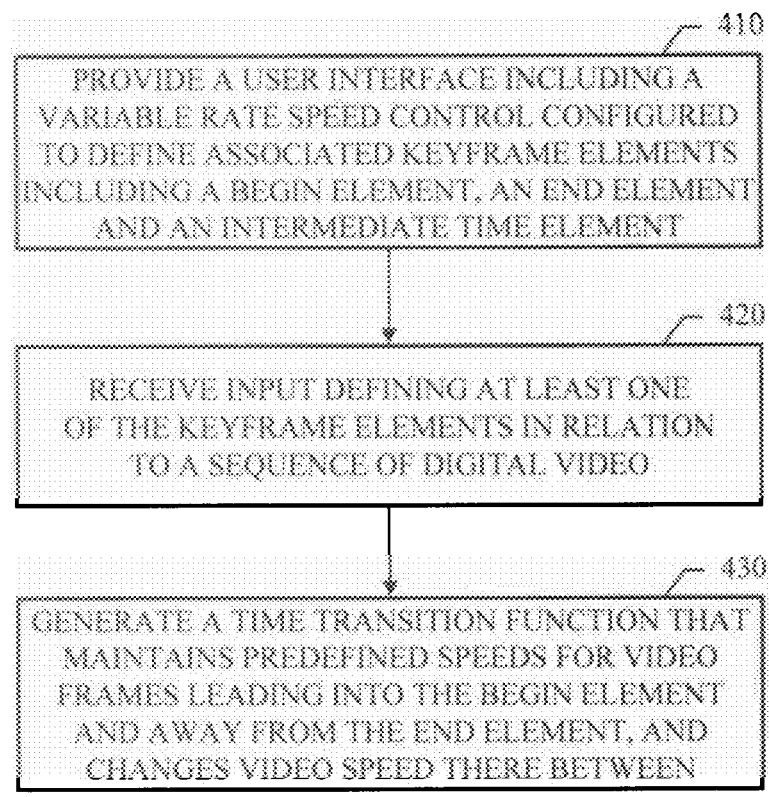
FIG. 4 shows an example process of generating a transition for remapping video playback time.

In addition to being able to readily define the playback rate for a portion of video in a controlled manner, as described above, it is also useful to be able to readily define a variable playback rate transition between two portions of video that have different playback rates. FIG. 4 shows an example process of generating a transition for remapping video playback time, as can be implemented using the system of FIG. 1. A user interface for a digital video editing system can be provided 410, including a variable rate speed control configured to define associated keyframe elements including a begin element, an end element and an intermediate time element.

The begin and end elements can refer to frames in a sequence of digital video, such as described above with respect to keyframe points. The associated begin and end elements can be separate keyframe controls in a timeline interface, or they can be two halves of a splittable keyframe control, such as described further below. The intermediate time element governs the time transition between the begin element and the element. The time element can be a specified type (e.g., a linear transition, a quadratic transition, a smooth variable curve), one or more values that control the transition (e.g., an exponential weighting used to determine a power curve, multiple control points within the transition), or a combination of these. In some implementations, asymmetrical curves and user defined Bezier curves can also be used in the transition region defined by the begin and end elements, and the transition region can be shifted to keep the begin and end elements linked to their respective source media frames, or only one of the begin and end elements need have its link with a source frame be maintained, while the other is free to shift in source media time.

Input is received 420, through the variable rate speed control, defining at least one of the keyframe elements in relation to a sequence of digital video. Separate inputs can be received to define the begin element, the end element and the time element. For example, a user can separately define the location of the begin element in the video sequence, the location of the end element in the video sequence, and the nature of the time transition there between. Alternatively, a single input can be used to define two of the elements, or all three of the elements at the same time.

A time transition function is generated 430 for remapping playback time of the sequence of digital video based on the input. The time transition function maintains predefined speed for video frames leading into the begin element, maintains predefined speed for video frames leading away from the end element, and changes video speed from a begin speed value associated with the begin element to an end speed value associated with the end element in accordance with one or more values associated with the intermediate time element. Thus, the variable playback rate transition can be confined by the begin and end elements and occurs over the media frames that the user has specified. Using the time transition function, the playback time of the sequence of digital video can be remapped, and the resulting video can be stored on a computer-readable medium.

Figure 5A:
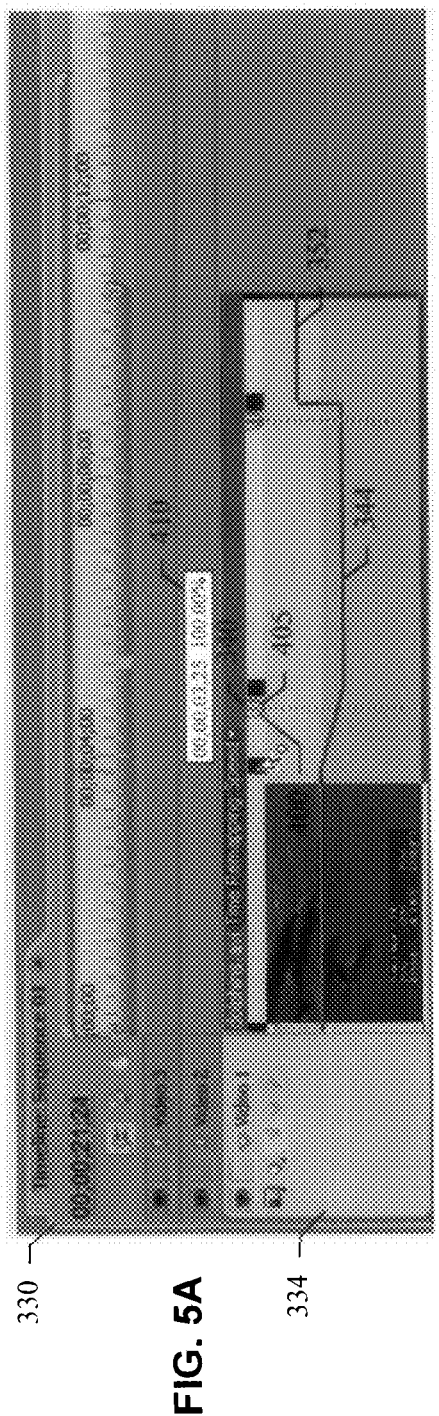
FIGS. 5A-5B show example interactions with a user interface to generate a transition for remapping video playback time.
Figure 5B:
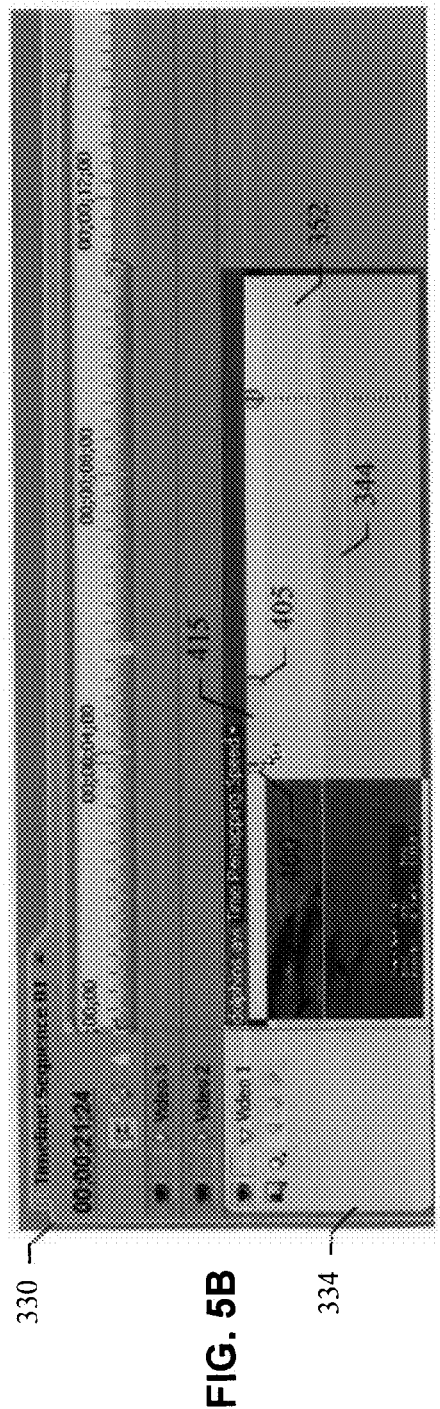

The process of FIG. 4 need not be used with the systems and techniques for changing playback rate for digital video described above, but doing so can provide a more versatile user interface. FIGS. 5A-5B show example interactions with the user interface described above in connection with FIGS. 3B-3G. These example interactions show the generation of a linear transition, between different playback rates, for remapping video playback time.

The keyframe point 340 has a begin element and an end element represented by a keyframe begin control 400 and a keyframe end control 405, respectively. In some implementations, the user can hold down a keyboard key and drag the controls 400 and 405 together to assign the keyframe point 340 to a new frame in the video, or the user can separately drag the controls 400 and 405 to assign the begin and end elements to new frames in the video. Alternatively, the keyframe point 340 can have three graphical controls in the user interface, one to move the point as a whole (thereby moving the begin and end elements together), and the two shown graphical controls to move the begin and end elements separately. Note that once the begin and end elements are separated, i.e., the keyframe control is split in two, the keyframe point 340 becomes two keyframe points.

Many user interactions with the control handles 400 and 405 can be enabled, using a mouse input devices and keyboard modifiers, in various implementations. Once the two halves are dragged apart, one can be slipped in media time while the other remains locked to its source media frame. They can be dragged together and slipped in media time (relocated to a different frame of the source media file). They can be dragged together, but remain locked to the media frame, stretching (slowing down) or compressing (speeding up) the segment to the left of these control points. Once the two halves are dragged apart, they can be dragged together and slipped in media time (relocated to a new set of frames in the source media file).

As shown in this example, the user selects the begin element control 400 and drags it to the left. During the drag operation, a pop-up display 410 shows the temporal location in the timeline (00;00;03;25) and the playback rate (one hundred percent) for the begin element being moved. As shown in FIG. 5B, after the keyframe control has been split, the transition region can be highlighted using shading 415, or using a pattern or other visual cue to distinguish the transition region. In this example, the time element has been predefined to be a linear transition. The user interface can include various options for changing the type of transition here, such as by using a drop down menu to select the time transition type.

In addition, note that the repositioning of the begin element has caused a portion of the video to be played back at a slower (varying) rate. Because of this, the segments 344 and 352 have moved to the right, and the total duration of the video playback has increased. These changes in duration can be dynamically shown to the user during creation of the transition region, using the techniques described above. The user can freely change the begin element, the end element or the time element for the transition without causing unwanted changes elsewhere in the video. Thus, the user interface can ensure that the transition event occurs over the media frames that the user desires, as well as at the desired point in time of the sequence playback. Moreover, the user interface can permit ramping out of and into the transition (ease-in and ease-out) without disturbing the locked media frames and sequence time range.

Figure 6:
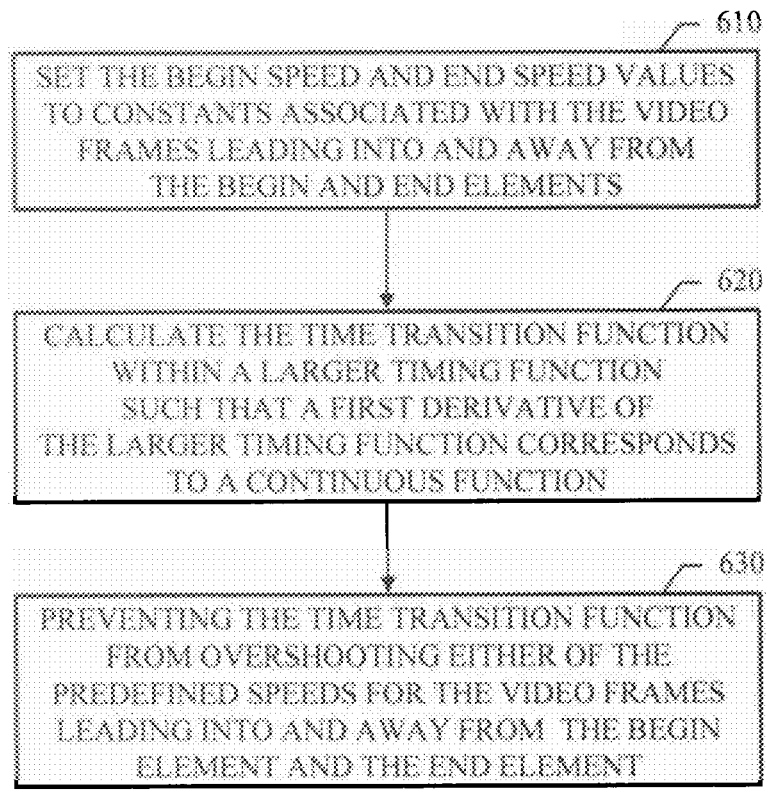
FIG. 6 shows an example process of generating a time transition function for use in remapping playback time of a sequence of digital video.

FIG. 6 shows an example process of generating a time transition function for use in remapping playback time of a sequence of digital video, as can be implemented using the system of FIG. 1. Generating the time transition function can involve setting 610 the begin speed value and the end speed value to constants associated with the video frames leading into the begin element and the video frames leading away from the end element. For example, if the playback speed is a constant before the begin element and a different constant after the end element, these constants can be used in generating the time transition function. By specifying two control points and keeping the different velocities constant on either side of the transition region, the problem space is constrained, and the video editor can quickly produce consistently predictable and high-quality results. Moreover, the variable speed playback region can be kept smooth (smoothly varying speeds), and out of sequence or out of order frame sequences (time jumps, either forward or backward) can be prevented, since no frames will be skipped.

Further, if the playback speed is varying, either before the begin element or after the end element, constant values can still be used, or this variation can be taken into account when setting the begin speed value and the end speed value. Generating the time transition function can involve calculating 620 the time transition function within a larger timing function including the predefined speed for the video frames leading into the begin element (which can be either a constant speed or a varying speed), the predefined speed for the video frames leading away from the end element (which again can be either a constant speed or a varying speed) and the time transition function, such that a first derivative of the larger timing function corresponds to a continuous function. The time transition function can be generated so as to connect the playback rates on either side of the transition with a continuous first derivative. Thus, the changes in playback rate can remain smooth when entering the transition region, passing through the transition region, and leaving the transition region.

In addition, generating the time transition function can involve preventing 630 the time transition function from overshooting either the predefined speed for the video frames leading into the begin element or the predefined speed for the video frames leading away from the end element. When the playback speeds on the two sides of the transition region are constants, preventing overshoot can improve the transition by avoiding undesirable accelerations or decelerations in playback rate. For example, if the transition is from a constant playback rate of one hundred percent of the original speed to fifty percent of the original speed, it may appear strange to have the playback rate initially go faster than one hundred percent at the beginning of the transition, and also go slower than fifty percent at the end of the transition, which can happen in traditional transitions between different playback rates for video sequences. Various approaches can be used to prevent overshoot, including the use of power curves as described further below.

Figure 7:
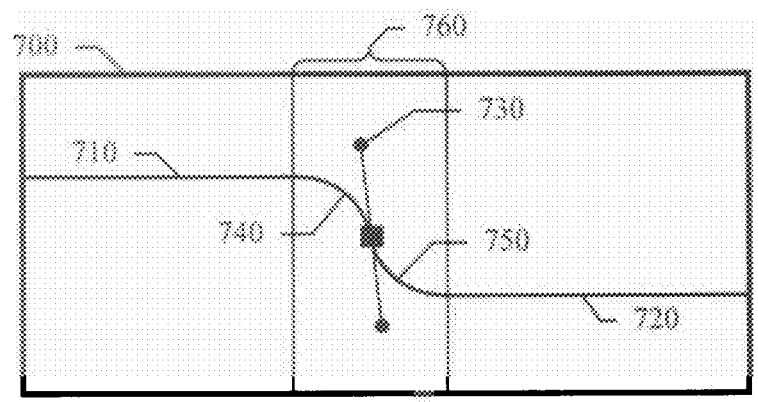
FIG. 7 shows an example user interface control used to define a transition region.

FIG. 7 shows an example user interface control used to define a transition region. A portion 700 of a track item is shown with a plot of playback rate overlaid thereon. A single control handle 730 is shown to the user for the transition region 760, where this control handle 730 is useable to define one or more values of an intermediate time element for the transition region 760. As shown, the one or more values define a non-linear transition between the playback rate 710 before the transition and the playback rate 720 after the transition. In this example, the non-linear transition is constructed from two power curves 740 and 750, but in general, one or more control handles can be provided to allow a user to specify a non-linear ease-in/ease-out curve between the begin and end elements.

For example, a set of control points representing a Bezier curve can be presented, allowing a user to smoothly ramp the transition between the begin and end elements defining the transition region 760. Regardless of the types of curve(s) used to define the intermediate time element for the transition region 760, it may be preferable that the net integral of the curve(s) match that of a linear transition. By keeping the area under the curve(s) equal to that of the linear transition, a linear curve can be readily replaced with a non-linear curve in the transition region 760 and smooth ease-in and ease-out of the variable playback transition can be readily accomplished. In addition, the control handle 730 can be designed to control various aspects of the curve(s) and also potentially the begin and end elements of the transition region 760. For example, rotating the control handle 730 can adjust the steepness of symmetrical curves around the center point of the transition region 760, and when a keyboard key is held down, moving the control handle 730 can adjust the temporal location of the begin and end elements with respect to the source media (e.g., as a slider up and down that controls both the begin and end elements at the same time, or having the top half of the control handle 730 control the begin element and the bottom half of the control handle 730 control the end element) thereby changing the length of the transition region 760.

By moving the control handle 730, the user can specify values used by the system to determine a combination of the two power curves 740 and 750, which are rotationally symmetrical around a central point in the transition. For example, the system can receive input through the control handle 730 that specifies an exponential weighting used to determine the two power curves 740 and 750. Thus, the user can be given fine control over how quickly the transition occurs between user specified begin and end points for the transition region, while at the same time, the transition remains smooth because of the selected type for the transition.

Given a transition region, where two or more frames are to be played at variable frame rates to support the transition from the before-start transition frame rate to the after-end transition frame rate, the length of each frame and the blending of frames to be played within the transition region can be defined based on the user defined graphic function of the transition curve. This transition curve can be constrained to be a continuous change in velocity such that the start and end transition points do not change and the rendering effect does not show a jump in frame change rate (or skipping of frames or playing them out of order). The values of the begin element, end element and time transition element can then be used to map input frames to output frames.

Positions of the keyframe elements in the user interface can indicate where the output frames show up in the output video sequence, and the velocities between the keyframe elements can be interpolated based on the values of the keyframe elements. The begin and end elements specify the transition span over which acceleration is calculated (e.g., as a linear function or a non-linear function, such as the two rotationally symmetrical power curves), and one or more values for the intermediate time element (e.g., one or more exponential weightings) can be used to calculate the frame rates in the transition region.

Figure 8:
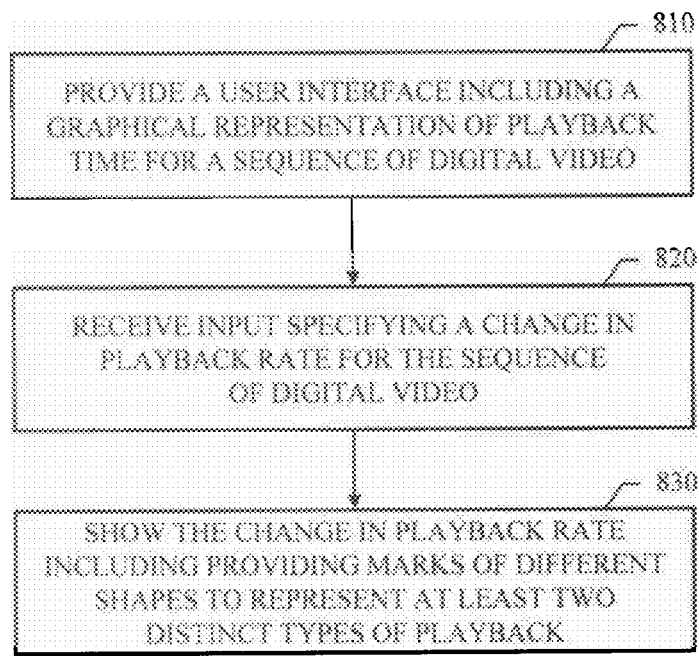
FIG. 8 shows an example process of indicating different video playback rates, including different playback directions and varying playback rates.

In addition to defining playback rates and variable playback rate transitions for digital video, as described above, it is also useful to be able to readily show to a user the nature of different playback rates in the user interface. FIG. 8 shows an example process of indicating different video playback rates, including different playback directions and varying playback rates, as can be implemented using the system of FIG. 1. A user interface for a digital video editing system is provided 810, where the user interface includes a graphical representation of playback time for a sequence of digital video. This graphical representation can include a plot of playback rate as described above, or this graphical representation can include a traditional speed graph, where one hundred percent speed is represented by any line that is at a forty-five degree angle, steeper angles represent faster playback, lower angles represent slower playback, flat lines represent a still image, and lines that dip down from left to right represent reverse motion.

Input specifying a change in playback rate for the sequence of digital video can be received 820. This can involve the techniques described above, or traditional techniques for changing video playback rates. The change in playback rate can be shown 830 by providing marks along the graphical representation of playback time for the sequence of digital video, where the marks include different shapes to represent at least two different playback rates. For example, the marks can include different shapes to represent forward playback, reverse playback and still frame playback, and the marks can also represent acceleration and deceleration of playback rates, as described further below. Thus, as used herein, "different playback rates" includes different constant playback rates, varying playback rates and different playback directions or still frame playback.

The process of FIG. 8 need not be used with the systems and techniques for changing playback rate and defining playback rate transitions for digital video described above, but doing so can provide a better user interface. FIGS. 9A-9D show example interactions with the user interface described above in connection with FIGS. 3B-3G and 5A-5B. These example interactions show the use of specific marks for indicating still frame playback and reverse playback sections.

In this example, a user creates a new keyframe point 900. The user then hold down a keyboard key to indicate still frame playback and drags the keyframe point 900 to the right to specify a duration of still frame playback. As shown in this example, a temporary marker 905 shows the temporal location of the end of the still frame segment in the timeline, and the cursor changes to a still frame icon 910 (double vertical bars) that shows the segment being created is a still frame playback segment. During the drag operation, a pop-up display shows the temporal location in the timeline (00;00;02; 08) of the temporary marker 905 as it moves to the right, and the playback rate (zero percent) for this still frame segment. As shown in FIG. 9B, after the drag operation, a keyframe point 915 shows the beginning of the still frame segment, a keyframe point 925 shows the end of the still frame segment, a series of marks 920 (vertical line shapes) clearly indicate the period of still frame playback, and segment 930 of the plot shows the playback rate at the zero level.

Note that the graphical controls for the keyframe points 915 and 920 can also highlight the fact that these points mark the boundary of a still frame segment by using a vertical interior bar, rather than a beveled interior bar as with regular keyframe points, or no interior bar as with keyframe points surrounding transition regions. Alternative designs can be used to distinguish the unique keyframes between forward playback, reverse playback, still image segments, and transition regions. In addition, note that the creation of the still frame segment 930 has moved the previously created transition region and the segments 344 and 352 farther out to the right. And again, the total duration of the video playback has increased. These changes in duration can be dynamically shown to the user during creation of the still frame segment, using the techniques described above.

Figure 9C:
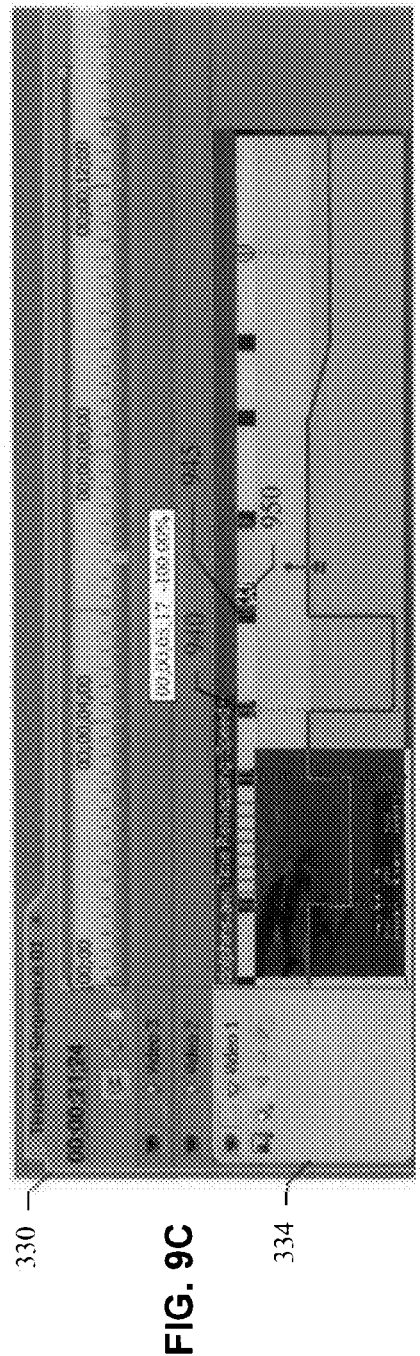

As shown in FIG. 9C, a user creates a new keyframe point 940 between the still frame segment and the beginning of the transition region. The user then hold down a keyboard key to indicate reverse playback and drags the keyframe point 940 to the right to specify a duration of reverse playback. As shown in this example, a temporary marker 945 shows the temporal location of the end of the reverse segment in the timeline as it is created, and the cursor changes to a reverse playback icon 950 (left pointing arrow heads) that shows the segment being created is a reverse playback segment. During the drag operation, a pop-up display shows the temporal location in the timeline (00;00;05;17) of the temporary marker 945 as it moves to the right (in FIG. 9C, the marker 945 is just crossing over the original temporal position of the beginning of the transition region), and the playback rate (negative one hundred percent) for this reverse segment.

Figure 9D:
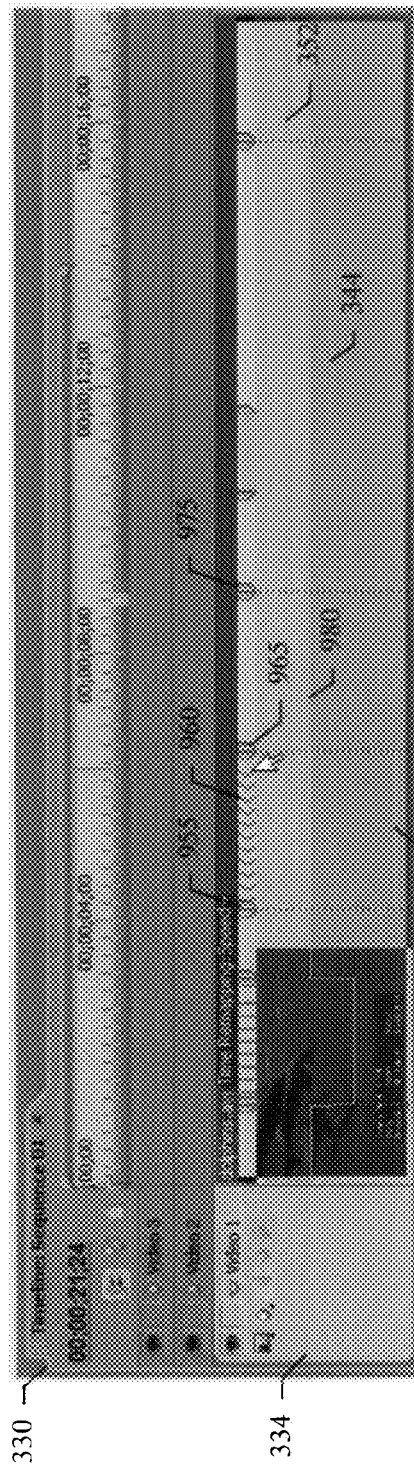

As shown in FIG. 9D, after the drag operation, a keyframe point 955 shows the beginning of the reverse segment, a keyframe point 965 shows the end of the reverse segment, a series of marks 960 (less-than sign shapes) clearly indicate the period of reverse playback, and a segment 970 of the plot shows the negative playback rate (below the still frame playback rate of zero). In addition, a keyframe point 975 shows the end of a forward segment 980 that corresponds to the reverse segment just created. Thus, the two halves of the video palindrome resulting from the creation of the reverse segment are clearly shown to the user. The forward segment 980 is automatically created at the end of the reverse segment 970 to catch back up to where the original reverse playback started in the source media.

Note that the creation of the reverse segment has also moved the previously created transition region and the segments 344 and 352 farther out to the right. The total duration of the track item has increased (it gets longer), and the frame order sequence is preserved (no jumps in time). These changes in duration can be dynamically shown to the user during creation of the reverse segment, using the techniques described above. In addition, the new reverse segment 970 can be adjusted up or down, to speed up or slow down the reverse playback rate, as described above.

Only two shapes are shown in FIG. 9D, but additional shapes can be used, as well as alternative shading and marking schemes. For example, a chevron can be used identify the transition region where frame rate is decreasing, an inverted chevron can be used to identify a transition region where frame rate is increasing, and a greater-than sign can be used to indicate constant forward playback. Alternatively, a greater-than sign can be used to represent forward playback (irrespective of whether playback is constant or has positive or negative acceleration), a less-than sign can be used to represent reverse playback (irrespective of whether playback is constant or has positive or negative acceleration), and a vertical line can be used to represent still frame playback. In addition, the different shapes used can be indexed to locations in a graphical representation of playback time, to represent varying degrees of playback rate.

Figure 10D:
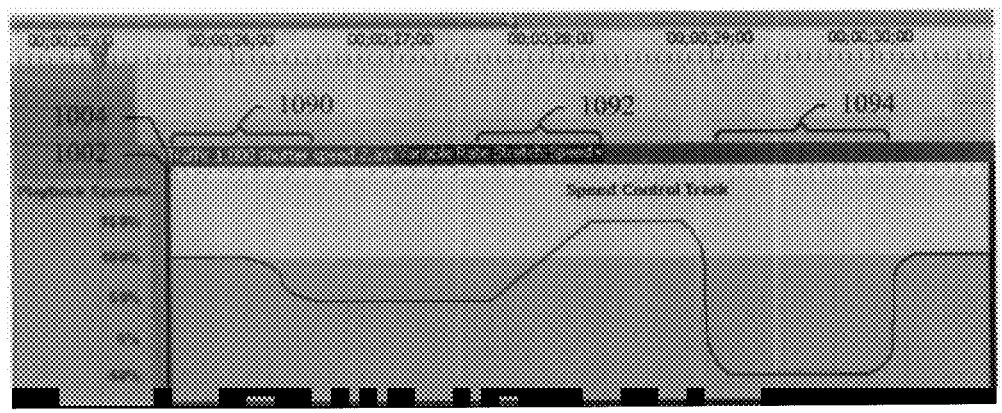
FIGS. 10A-10D show various examples of using marks to indicate different video playback rates.
Figure 10A:
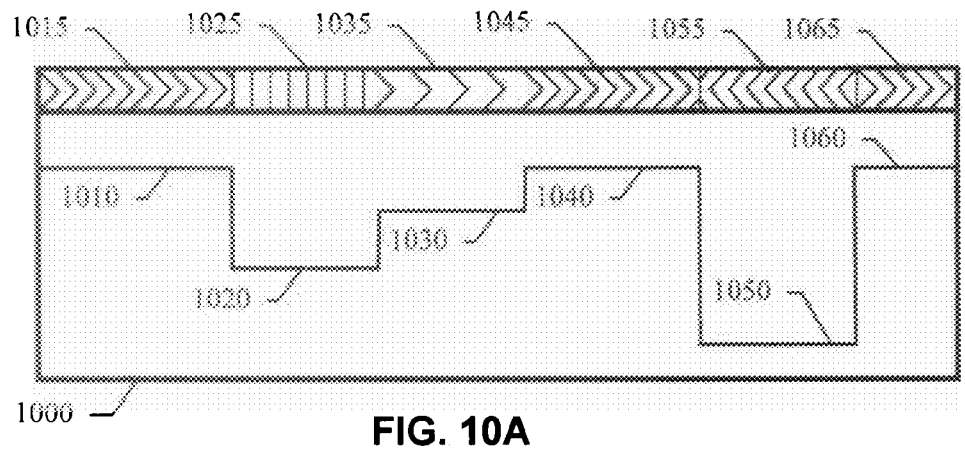
Figure 10B:
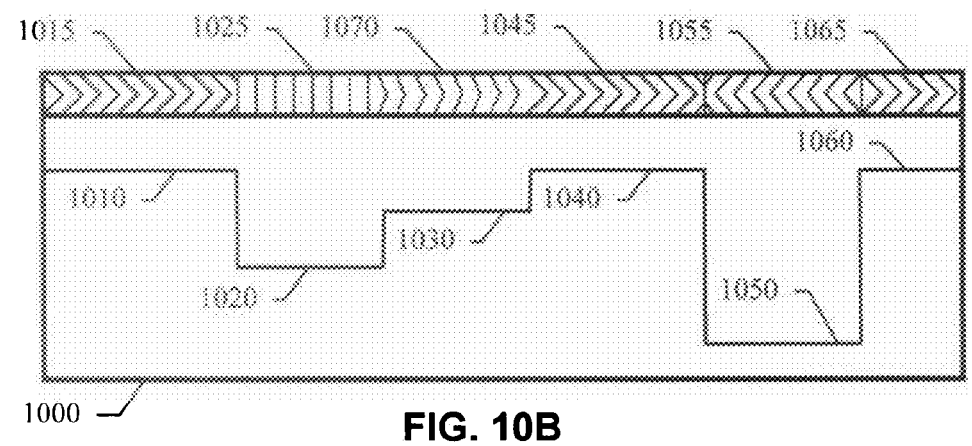
Figure 10C:
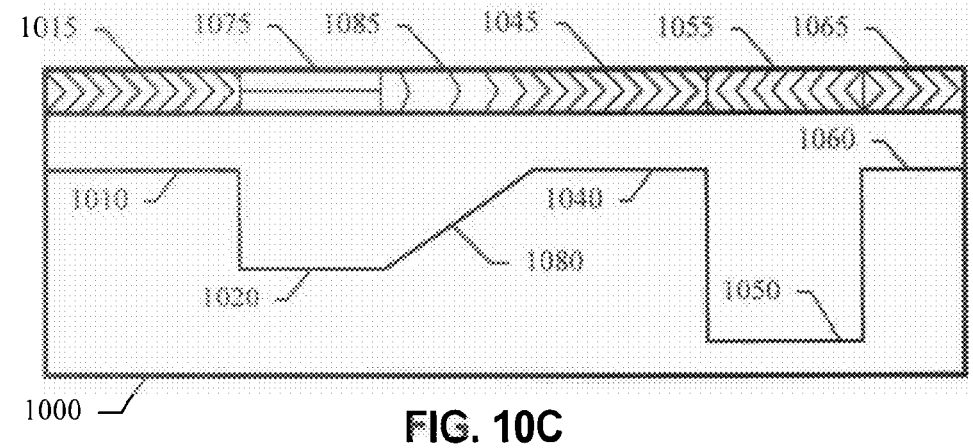

FIGS. 10A-10C show various examples of using marks to indicate different video playback rates in a portion 1000 of a track item in which a plot of playback rate is presented. In FIG. 10A, a forward segment 1010 has a corresponding set of greater-than signs 1015 indexed thereto, a still frame segment 1020 has a corresponding set of vertical lines 1025 indexed thereto, a forward segment 1030 has a corresponding set of greater-than signs 1035 indexed thereto, a forward segment 1040 has a corresponding set of greater-than signs 1045 indexed thereto, a reverse segment 1050 has a corresponding set of less-than signs 1055 indexed thereto, and a forward segment 1060 has a corresponding set of greater-than signs 1065 indexed thereto.

Also, in the example of FIG. 10A, the different shapes are used by adjusting density of the marks representing forward playback and reverse playback in accordance with playback rate at the indexed locations. Thus, the density of marks is reduced for the greater-than signs 1035, which correspond to the half forward speed segment 1030. In the example of FIG. 10B, the different shapes are used by modifying an angle of the less-than and greater-than signs in accordance with playback rate at the indexed locations. Thus, the angle of the marks is increased for greater-than signs 1070, which correspond to the half forward speed segment 1030.

Many variations of the above are also possible. For example, as shown in FIG. 10C, horizontal line(s) 1075 can be used for the still frame segment 1020. Transition regions can also be represented using distinctive marks or the greater-than and less-than signs. For example, a segment of increasing playback rate 1080 can be identifying using marks 1085 that show the change in playback rate using both density and angle.

FIG. 10D shows another example, where transition regions are shown using greater-than and less-than signs, and changes in playback rate are shown using density in a speed control track 1002 included in a track item 1004 in a timeline interface. A segment 1090 shows the video starting at one hundred percent forward speed and then decelerating non-linearly to fifty percent forward speed. A segment 1092 shows the video accelerating linearly from fifty percent forward speed to one hundred and fifty percent forward speed. A segment 1094 shows fifty percent reverse speed with non-linear entry and exit from the segment 1094.

In general, the user interface display can indicate the playback direction and velocity of video that has variable speed effects applied thereto. The user can see at a glance which segments are playing forward, in reverse motion or as still frame, along with a general indication of the velocity of the playback. The user interface can provide clear and immediate feedback during the process of applying variable speed playback effects to video. Dynamic indicators in a speed control track (e.g., a separate portion of a track item in a timeline interface) can represent how the video will play back over time in a timeline sequence, where the indicators of playback direction and velocity correspond directly to the sequence. Without actually playing the video, a user can see at a glance whether the video is playing in forward motion, reverse motion, still frame (freeze frame) image, acceleration of playback speed, deceleration of playback speed, or changing playback direction. Moreover, by presenting the speed control track in the timeline interface, the marks that indicate playback rate (direction and velocity) can have a one-to-one relationship to the segments (and thus their frames) that actually play back in the sequence.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. In addition, audio channel(s) can be processed along with the video channel(s), or the audio channel(s) can be decoupled from the video channel(s) during variable playback rate adjustments. Moreover, the described techniques can be applied to various different track types, such as a title track.

What is claimed is:

1. A computer-implemented method comprising:
providing a user interface for a digital video editing system, the user interface comprising a variable rate speed control configured to define associated keyframe elements comprising a begin element, an end element and an intermediate time element;
receiving, through the variable rate speed control, an input defining at least one of the keyframe elements in relation to a sequence of digital video associated with a playback time;
generating a time transition function between the begin element and the end element using the intermediate time element based on the input, the time transition function maintaining a predefined speed for video frames leading into the begin element, maintains predefined speed for video frames leading away from the end element, and changes video speed from a begin speed value associated with the begin element to an end speed value associated with the end element in accordance with one or more values associated with the intermediate time element; and
remapping the playback time of the sequence of digital video based on the generated time transition function, the remapped playback time being varied for the video frames in between the begin element and the end element, and the playback time maintained for the video frames leading into the begin element and for the video frames leading away from the end element.

2. The method of claim 1, wherein providing the user interface comprises presenting a single control handle useable to define the one or more values of the intermediate time element, the one or more values defining a non-linear transition between the begin element and the end element, and receiving the input comprises receiving the one or more values of the intermediate time element through the single control handle.

3. The method of claim 1, wherein providing the user interface comprises presenting a first control handle useable to define values for the begin element and a second control handle useable to define values for the end element, and receiving the input comprises:
receiving, through at least one of the first and second control handles, a source-referenced input specifying a location in the sequence of digital video; and
separately receiving, through at least one of the first and second control handles, a target-referenced input specifying a duration for the time transition function.

4. The method of claim 1, wherein generating the time transition function comprises setting the begin speed value to a constant begin speed associated with the video frames leading into the begin element, and setting the end speed value to a constant end speed associated with the video frames leading away from the end element.

5. The method of claim 1, wherein generating the time transition function comprises maintaining smooth changes in playback rate when entering a transition region, passing through the transition region, and leaving the transition region.

6. The method of claim 5, wherein generating the time transition function comprises preventing the time transition function from overshooting either the predefined speed for the video frames leading into the begin element or the predefined speed for the video frames leading away from the end element.

7. The method of claim 1, wherein generating the time transition function comprises determining a combination of two curves between a first location of the begin element and a second location of the end element, the two curves being rotationally symmetrical around a central point between the first and second locations.

8. The method of claim 7, wherein receiving the input comprises receiving an exponential weighting for the intermediate time element, and determining the combination of two curves further comprises determining the two curves in accordance with the exponential weighting.

9. A computer program product, encoded on a non-transitory computer-readable medium, operable to cause data processing apparatus to perform operations comprising:
providing a user interface for a digital video editing system, the user interface comprising a variable rate speed control configured to define associated keyframe elements comprising a begin element, an end element and an intermediate time element;
receiving, through the variable rate speed control, an input defining at least one of the keyframe elements in relation to a sequence of digital video associated with a playback time;
generating a time transition function between the begin element and the end element using the intermediate time element based on the input, the time transition function maintaining a predefined speed for video frames leading into the begin element, maintains predefined speed for video frames leading away from the end element, and changes video speed from a begin speed value associated with the begin element to an end speed value associated with the end element in accordance with one or more values associated with the intermediate time element; and
remapping the playback time of the sequence of digital video based on the generated time transition function, the remapped playback time being varied for the video frames in between the begin element and the end element, and the playback time maintained for the video frames leading into the begin element and for the video frames leading away from the end element.

10. The computer program product of claim 9, wherein providing the user interface comprises presenting a single control handle useable to define the one or more values of the intermediate time element, the one or more values defining a non-linear transition between the begin element and the end element, and receiving the input comprises receiving the one or more values of the intermediate time element through the single control handle.

11. The computer program product of claim 9, wherein providing the user interface comprises presenting a first control handle useable to define values for the begin element and a second control handle useable to define values for the end element, and receiving the input comprises:

receiving, through at least one of the first and second control handles, a source-referenced input specifying a location in the sequence of digital video; and separately receiving, through at least one of the first and second control handles, a target-referenced input specifying a duration for the time transition function.

12. The computer program product of claim 9, wherein generating the time transition function comprises setting the begin speed value to a constant begin speed associated with the video frames leading into the begin element, and setting the end speed value to a constant end speed associated with the video frames leading away from the end element.

13. The computer program product of claim 9, wherein generating the time transition function comprises maintaining smooth changes in playback rate when entering a transition region, passing through the transition region, and leaving the transition region.

14. The computer program product of claim 13, wherein generating the time transition function comprises preventing the time transition function from overshooting either the predefined speed for the video frames leading into the begin element or the predefined speed for the video frames leading away from the end element.

15. The computer program product of claim 9, wherein generating the time transition function comprises determining a combination of two curves between a first location of the begin element and a second location of the end element, the two curves being rotationally symmetrical around a central point between the first and second locations.

16. The computer program product of claim 15, wherein receiving the input comprises receiving an exponential weighting for the intermediate time element, and determining the combination of two curves further comprises determining the two curves in accordance with the exponential weighting.

17. A system comprising:
a device configured to display a user interface for a digital video editing system;
one or more processors to execute computer program instructions that are configured to perform operations comprising:
displaying the user interface for the digital video editing system, the user interface comprising a variable rate speed control configured to define associated keyframe elements comprising a begin element, an end element and an intermediate time element;
receiving, through the variable rate speed control, an input defining at least one of the keyframe elements in relation to a sequence of digital video associated with a playback time;
generating a time transition function between the begin element and the end element using the intermediate time element based on the input, the time transition function maintaining a predefined speed for video frames leading into the begin element, maintains predefined speed for video frames leading away from the end element, and changes video speed from a begin speed value associated with the begin element to an end speed value associated with the end element in accordance with one or more values associated with the intermediate time element; and
remapping the playback time of the sequence of digital video based on the generated time transition function, the remapped playback time being varied for the video frames in between the begin element and the end element, and the playback time maintained for the video frames leading into the begin element and for the video frames leading away from the end element.

18. The system of claim 17, wherein providing the user interface comprises presenting a single control handle useable to define the one or more values of the intermediate time element, the one or more values defining a non-linear transition between the begin element and the end element, and receiving the input comprises receiving the one or more values of the intermediate time element through the single control handle.

19. The system of claim 17, wherein providing the user interface comprises presenting a first control handle useable to define values for the begin element and a second control handle useable to define values for the end element, and receiving the input comprises:
receiving, through at least one of the first and second control handles, a source-referenced input specifying a location in the sequence of digital video; and
separately receiving, through at least one of the first and second control handles, a target-referenced input specifying a duration for the time transition function.

20. The system of claim 17, wherein generating the time transition function comprises setting the begin speed value to a constant begin speed associated with the video frames leading into the begin element, and setting the end speed value to a constant end speed associated with the video frames leading away from the end element.

21. The system of claim 17, wherein generating the time transition function comprises maintaining smooth changes in playback rate when entering a transition region, passing through the transition region, and leaving the transition region.

22. The system of claim 21, wherein generating the time transition function comprises preventing the time transition function from overshooting either the predefined speed for the video frames leading into the begin element or the predefined speed for the video frames leading away from the end element.

23. The system of claim 17, wherein generating the time transition function comprises determining a combination of two curves between a first location of the begin element and a second location of the end element, the two curves being rotationally symmetrical around a central point between the first and second locations.

24. The system of claim 23, wherein receiving the input comprises receiving an exponential weighting for the intermediate time element, and determining the combination of two curves further comprises determining the two curves in accordance with the exponential weighting.

25. The system of claim 17, wherein the one or more computers comprise a server operable to interact with the user interface device through a data communication network, and the user interface device is operable to interact with the server as a client.

26. The system of claim 25, wherein the user interface device comprises a personal computer running a web browser.

27. The system of claim 17, wherein the one or more computers comprises one personal computer, and the personal computer comprises the user interface device.

* * * * *